US009656862B2

(12) United States Patent
Xie et al.

(10) Patent No.: US 9,656,862 B2
(45) Date of Patent: May 23, 2017

(54) HIGH SURFACE AREA NANO-STRUCTURED GRAPHENE COMPOSITES AND CAPACITIVE DEVICES INCORPORATING THE SAME

(75) Inventors: Jian Xie, Carmel, IN (US); Meixian Wang, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 325 days.

(21) Appl. No.: 13/372,187

(22) Filed: Feb. 13, 2012

(65) Prior Publication Data

US 2012/0208088 A1    Aug. 16, 2012

Related U.S. Application Data

(60) Provisional application No. 61/442,281, filed on Feb. 13, 2011, provisional application No. 61/475,358, filed on Apr. 14, 2011.

(51) Int. Cl.
*H01M 4/583* (2010.01)
*B32B 5/16* (2006.01)
(Continued)

(52) U.S. Cl.
CPC ............ *C01B 3/0021* (2013.01); *B01D 53/02* (2013.01); *B01J 20/20* (2013.01); *B01J 20/205* (2013.01); *B01J 20/28035* (2013.01); *B32B 3/085* (2013.01); *B32B 9/007* (2013.01); *B82Y 30/00* (2013.01); *B82Y 40/00* (2013.01); *B01D 53/62* (2013.01); *B01D 2253/102* (2013.01); *B01D 2253/304* (2013.01); *B01D 2253/306* (2013.01);
(Continued)

(58) Field of Classification Search
None
See application file for complete search history.

(56) References Cited

U.S. PATENT DOCUMENTS

2003/0098640 A1    5/2003 Kishi et al.
2004/0009346 A1    1/2004 Jang
(Continued)

FOREIGN PATENT DOCUMENTS

JP    2010-129385    * 6/2010   ............. H01M 4/92
WO   WO-2009143405   11/2009

OTHER PUBLICATIONS

Si et al, Exfoliated Graphene Separated by Platinum Nanoparticles, 20 Chem. Mat'l. 6792-97 (2008).*

(Continued)

*Primary Examiner* — Yoshitoshi Takeuchi
(74) *Attorney, Agent, or Firm* — C. John Brannon; Brannon Sowers & Cracraft PC

(57) ABSTRACT

A carbon composite material, including a plurality of spaced graphene sheets, each respective sheet having opposed generally planar surfaces, and a plurality of functionalized carbonaceous particles. At least some functionalized carbonaceous particles are disposed between any two adjacent graphene sheets, and each respective at least some functionalized carbonaceous particle is attached to both respective any two adjacent graphene sheets. Each respective graphene sheet comprises at least one layer of graphene and at least portions of respective any two adjacent graphene sheets are oriented substantially parallel with one another.

5 Claims, 17 Drawing Sheets

(51) Int. Cl.
    *B82Y 30/00*     (2011.01)
    *C01B 3/00*     (2006.01)
    *B01D 53/02*     (2006.01)
    *B32B 3/08*     (2006.01)
    *B32B 9/00*     (2006.01)
    *B82Y 40/00*     (2011.01)
    *B01J 20/20*     (2006.01)
    *B01J 20/28*     (2006.01)
    *B01D 53/62*     (2006.01)

(52) U.S. Cl.
    CPC .. *B01D 2255/702* (2013.01); *B01D 2257/504* (2013.01); *B01D 2259/4525* (2013.01); *Y02C 10/08* (2013.01); *Y02E 60/325* (2013.01); *Y02P 20/152* (2015.11); *Y10T 428/25* (2015.01)

(56) References Cited

U.S. PATENT DOCUMENTS

2006/0165988 A1     7/2006   Chiang et al.
2009/0092747 A1*   4/2009   Zhamu et al. .................. 427/80
2009/0291270 A1   11/2009   Zettl et al.
2010/0327847 A1   12/2010   Leiber et al.

OTHER PUBLICATIONS

English translation of JP 2010-129385 (2010).*
Chemguide, Types of Catalysis, www.chemguide.co.uk/physical/catalysis/introduction.html (2004).*
Chemguide, "Types of Catalysis", www.chemguide.co.uk/physical/catalysis/introduction.html, 2004.

* cited by examiner

HIGH SURFACE AREA NANO-STRUCTURED GRAPHENE COMPOSITES AND CAPACITIVE DEVICES INCORPORATING THE SAME

CROSS-REFERENCE TO RELATED APPLICATIONS

This patent application claims priority to U.S. Provisional Patent Application Ser. No. 61/442,281, filed on Feb. 13, 2011, and to U.S. Provisional Patent Application Ser. No. 61/475,358, filed on Apr. 14, 2011.

TECHNICAL FIELD

The novel technology relates generally to materials science, and, more particularly, to a high surface area graphene composite material.

BACKGROUND

Graphene, a single-atom-thick sheet consisting of $sp^2$ hybridized carbon atoms arrayed in a honeycomb pattern, is the building block of graphitic carbons. Graphene may be viewed as an individual atomic plane of the graphite structure. Graphene as a two-dimensional nanosheet has attracted increasing interest due to its unique properties of high in-plane electronic conductivity, high tensile modulus, and high surface area, which make graphene an attractive candidate for applications in electronic devices and composite materials. Moreover, with its high surface area and good chemical stability, graphene may be used as a gas adsorbent, ultracapacitor material, or a supporting material for developing novel heterogeneous catalysts with enhanced catalytic activity.

Graphene may be produced by any one of several methods, including the straightforward exfoliation technique of manually peeling off of the top surface of small mesas of pyrolytic graphite, chemical vapor deposition on metal surfaces, epitaxial growth on electrically insulating surfaces, such as SiC, and the like. Although multiple production methods do exist, large-scale applications of graphene require simple and cost effective methods of production. Hence, the primary route in making graphene is still the exfoliation of graphite oxides followed by a chemical reduction.

In aqueous solvent dispersions of graphene prepared by chemical reduction, graphene sheets are separated by solvents stabilized by electrostatic forces associated with ionizable groups introduced during the exfoliation. However, like other dispersions of nanomaterials with high aspect ratios, after the solvent is removed from the dispersion, the dried graphene sheets (GSs) usually aggregate and form an irreversibly interconnected or tangled precipitated agglomerate. This agglomeration is driven by the van der Waals interactions between the neighboring graphene sheets, urging the graphene sheets to stack back together in a disorganized and typically haphazard fashion. This agglomeration also leads to a considerable loss of the effective surface area of graphene, which affects the graphene applications in, for example, supercapacitors, batteries, and catalyst supports, where a high surface area of active materials is desired for performance. Therefore, how to achieve the intrinsically ultra-high surface area of graphene in its solid state is of interest in advancing the applications of graphene materials.

Anchoring nanoparticles on the graphene surface before the GS's aggregation is one effective way to keep the GS's high surface area. The deposition of Pt nanoparticles on a graphene surface before drying has been shown to increase the surface area of the composite from 44 $m^2/g$ to 862 $m^2/g$ with the anchoring of the Pt nanoparticles on the surface. Graphene polyoxometalate nanoparticle composites have been observed to yield a graphene surface area of about 680 $m^2/g$. Graphene sheet/$RuO_2$ composites have been observed with increased surface area increases from 108 $m^2/g$ to 281 $m^2/g$. These composites also exhibited a high specific capacitance 570 F/g and an enhanced rate capability. Although the surface area of GSs have been increased with the addition of the nanoparticles, the resulting specific surface area was still much lower than the theoretical surface area of 2630 $m^2/g$ of the isolated GSs.

Thus, there is a need for graphene materials having effective surfaces areas approaching the theoretical maximum of 2630 $m^2/g$. Further, there remains a need for a method of reliably producing the same. The present novel technology addresses these needs.

DESCRIPTION OF PREFERRED EMBODIMENTS

Figure 1:
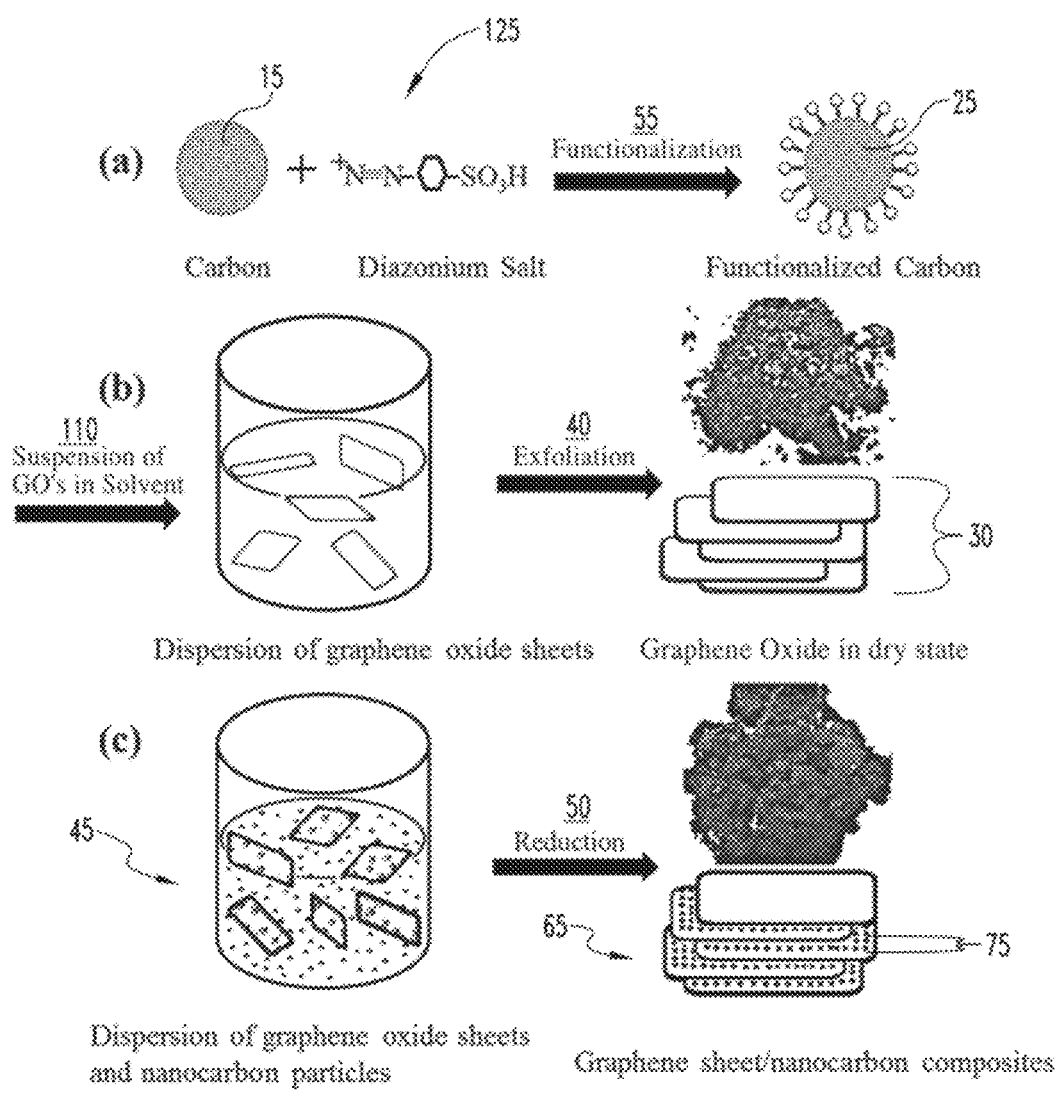
FIG. 1 is a schematic illustration of the graphene sheet (GS) and the graphene sheet nanocarbon composites (GSNC) preparation process.
Figure 2:
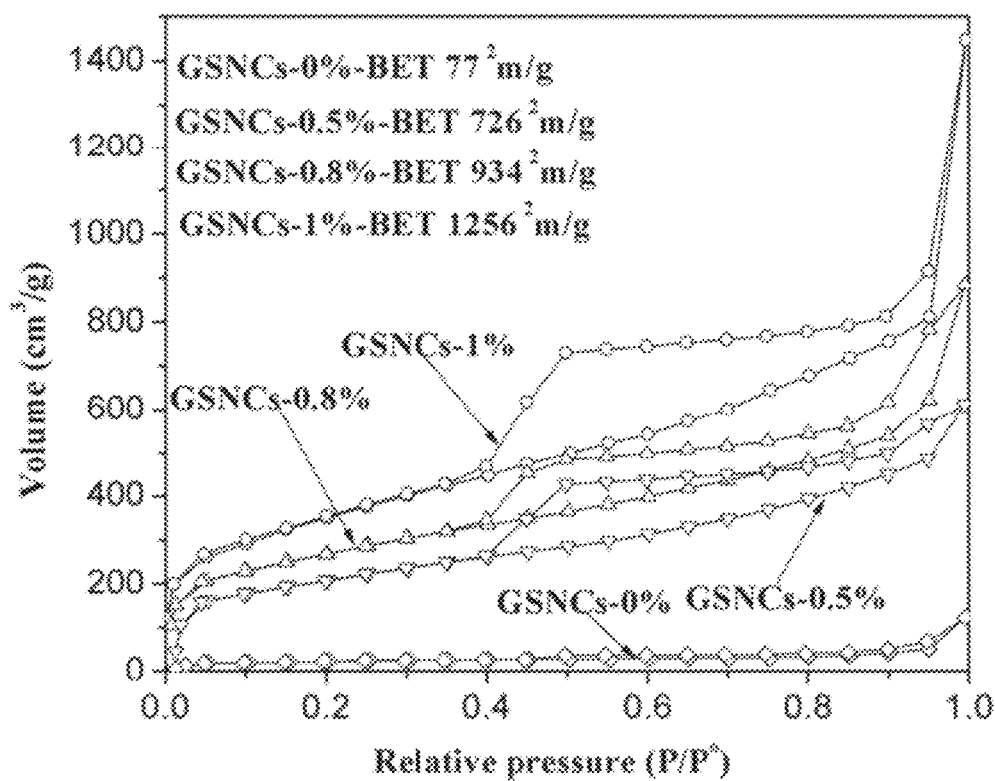
FIG. 2 graphically illustrates nitrogen adsorption and desorption of the as-prepared GNCs with different nanocarbon content.
Figure 3B:
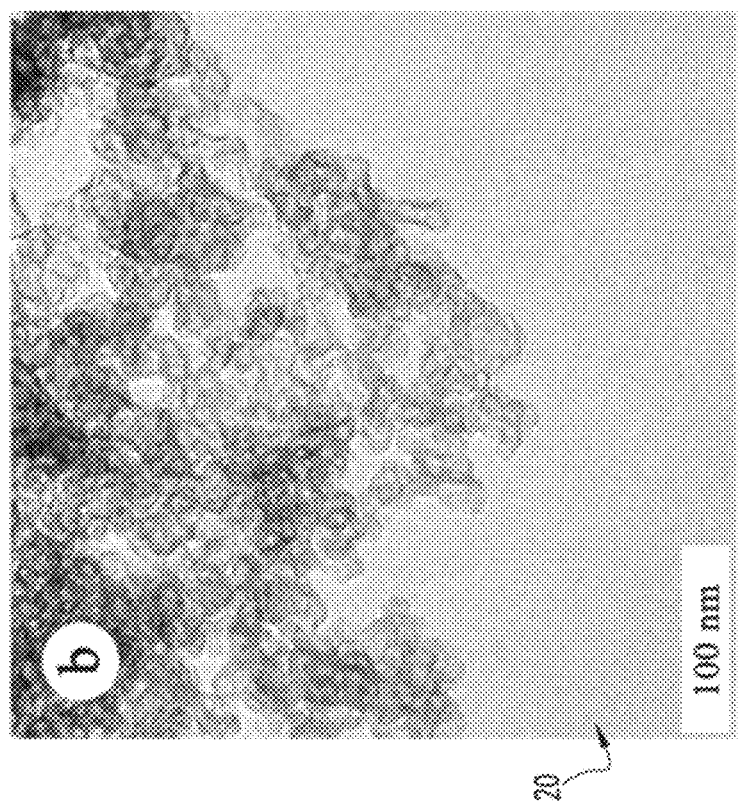
FIG. 3B illustrates TEM images of the as-prepared GSNCs with 1% nanocarbon content and a surface area of 1256 $m^2/g$.
Figure 3A:
FIG. 3A illustrates TEM images of the as-prepared GSNCs from pure GSs.
Figure 3D:
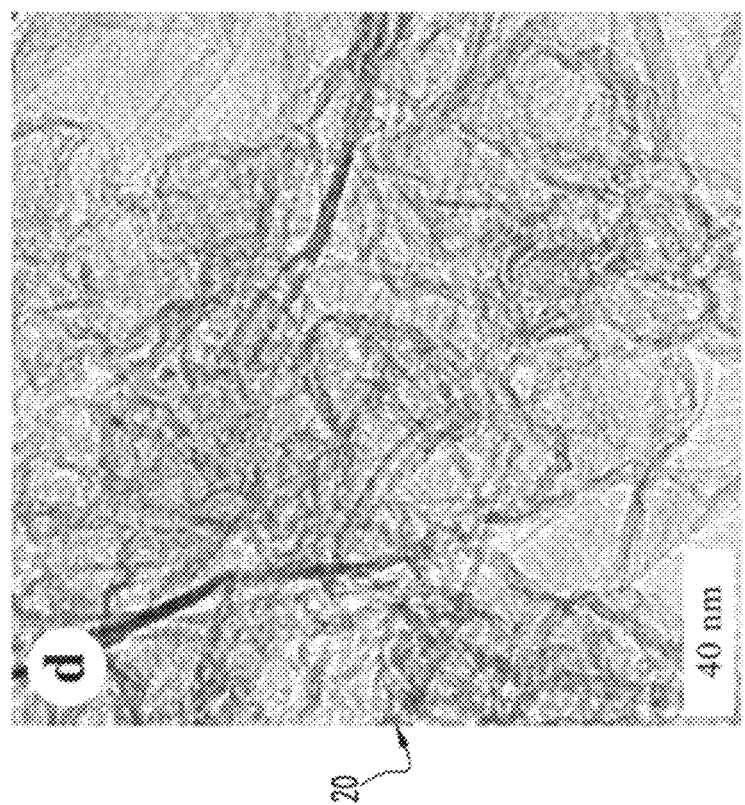
FIG. 3D illustrates TEM images of the as-prepared GSNCs with 1% nanocarbon content and a surface area of 1256 $m^2/g$.
Figure 3C:
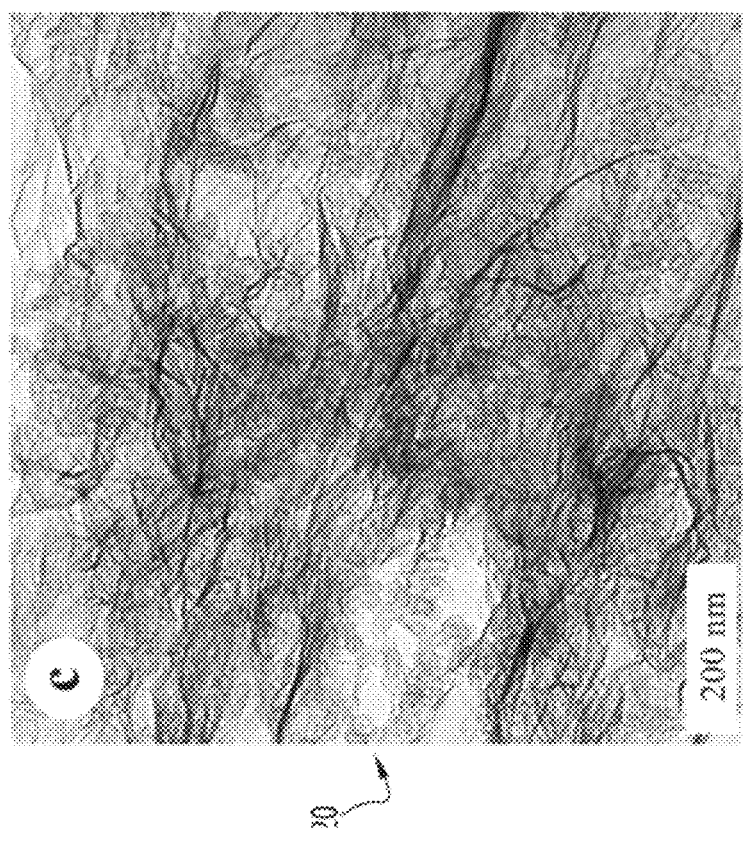
FIG. 3C illustrates TEM images of the as-prepared GSNCs with functionalized nanocarbons.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

According to a first embodiment of the present novel technology, as illustrated in FIGS. 1-5C, graphene sheets 10 were prepared by the exfoliation of graphite oxide (a layered material consisting of hydrophilic oxygenated graphene sheets with oxygen functional groups on their basal planes and edges), such as in water to yield a colloidal suspension of almost entirely individual graphene sheets 10. Nanosized carbon particles 15, typically carbon black particles 15, were functionalized with hydrophilic groups, such as —$SO_3H$ (i.e., bisulfate or hydrogen sulfite), and the GSNCs 20 were prepared with different loadings of the functionalized carbon black particles 25 by simultaneous chemical reduction of both the graphene oxides 30 and the functionalized carbon black particles 25 while in solution. Functionalization is the addition of functional groups onto the surface of a material by chemical synthesis methods or the like, and the functional group added can be subjected to ordinary synthesis methods to attach virtually any kind of compound onto the material's surface. The nanosized functionalized carbon black particles 25 attached to the surface of the GSs 10 and served as spacers to separate/support the neighboring GSs 10, which prevented the haphazard restacking of the graphene sheets 10 into a randomly oriented solid particulate mass, and consequently, resulted in the generation of increased surface area. The specific surface area of the composites 20 was 1256 $m^2$/g, and a maximum specific capacitance of 240 F/g was observed at a current density of 1A/g. In addition, graphene sheet composite-based capacitors using this composite material 20 for the electrodes exhibited enhanced rate capability, the maximum sustainable continuous or pulsed current output. The above improved electrochemical performance of the GSNCs 20 is a product of their high surface area and high electronic conductivity of the GSs 10.

While the carbon nanoparticles 15 discussed herein are specifically carbon black, other allotropes of carbon may be selected. Amorphous carbon, glass carbon, coke, carbon graphitized to various degrees of graphitization, diamond-like carbon, and diamond may also be selected, with the electrical and physical properties of the resulting composite material 20 varying as a result.

In the synthesis of the GSNCs 20, the GSs 10 were obtained by in situ chemical reduction of exfoliated graphene oxides 30. As shown in FIG. 1, the construction of the GSNCs involved the following steps: first, exfoliation 40 of graphite oxides, then, mixing 45 the graphene oxide sheets 30 and functionalized nanocarbons 25, and finally, chemical reduction 50 of the mixture. The nanocarbons 15 were functionalized 55 by the dizonium reaction, and the nanocarbons 25 are highly hydrophilic after functionalization 55. Graphene oxide sheets 30 exist in the liquid dispersion 60. After reduction 50 of the compound 20 in its solid state, the graphene sheets 10 aggregate 65 and stack back into a layer structure like graphite. Graphene oxide sheets 30 and carbon nanoparticles 25 exist together in dispersion 60; in the solid state the nanocarbons 25 serve as spacers, preventing the graphene sheets 10 from restacking back to the graphite structure, and thus make the graphene sheet 10 accessible on both sides and allowing access to the high surface area graphene composite 20. In the reduction process 50, the well-dispersed graphene oxide sheets 30 and the functionalized nanocarbons 25 were reduced simultaneously and the functionalized nanocarbon particles 25 became anchored 75 to the graphene sheets 10. The solid composites 20 float on the surface of the transparent liquid phase of the dispersion 60. The resultant graphene sheets 10 with attached functionalized nanocarbons 25 aggregated together to yield the GSNCs 20 upon drying.

Graphene oxides 30, possessing a considerable amount of hydroxyl and epoxide functional groups on both surfaces of each sheet 30, and carboxyl groups, mostly at the sheet edges, are strongly hydrophilic and can easily disperse in water. The nanocarbons 15 were functionalized 55 by diazonium reactions as shown in FIG. 1A. In this process, the hydrophilic —$SO_3H$ functional group was grafted onto the surface of the nanocarbons 15. As shown in FIG. 1, after functionalization 55 the nanocarbons 25 can disperse well in the water even if left for several months. After adding the functionalized nanocarbons 25 into the graphene sheet dispersion 60, the two materials were able to be easily mixed and formed uniform dispersion 60.

In order to explore the effects of the nanocarbon content on the composite surface areas, a series of controlled experiments were conducted by varying the content of the nanocarbon in the GSNCs 20 to 0, 0.5, 0.8 and 1 wt. %. The addition of the nanocarbons 25 into the dispersion 60 of the graphene sheets 30 led to the formation of well-dispersed nanocarbon particles 25 on the surface of the graphene sheets 30. The in situ formed nanocarbon particles 25 can serve as spacers to prevent aggregation/restacking of the individual graphene sheets 30 in the dispersion during the drying process and form a particle-sheet structured GSNC 20 in the solid state. It is reasonably expected that the in-situ-formed composites 20 have more of a rich porous structure and large available surface area for the charge-storage process than those obtained by drying the pure graphene sheets 10, in which the restacking of the graphene sheets 10 inevitably occurs.

The nitrogen-adsorption and -desorption isotherms of the as-prepared GSs 10 with different nanocarbon content exhibited type IV characteristics (FIG. 2), which are indicative of the presence of relatively large pores in the composites 20. It is worth noting that the Brunauer-Emmett-Teller (BET) specific surface area of the graphene sheets without the addition of nanocarbons (77 $m^2/g$) was much lower than the theoretical predictions for the isolated graphene sheets (2630 $m^2/g$). With the increase in nanocarbon content in the composites 20, the specific surface area also increased. The BET-specific surface area of the composites 20 with nanocarbon content of 1 wt. % reached as high as 1256 $m^2/g$, which is much higher than that of the nanocarbons 25 (790 $m^2/g$) and the pure GS 10 (77 $m^2/g$). In further trials, the BET-specific surface area of the composites 20 with additional nanocarbon material 25 was observed to be up to 1875 $m^2/g$, and values as high as 2000, 2100 and approaching the theoretical maximum are expected.

The large specific surface area suggests that the introduction of nanocarbon particles 25 between 2D graphene sheets 10 effectively limits the face-to-face stacking from about forty layers of graphene sheets 10 per stack to about two layers of graphene sheets 10 per stack when compared with that of dried pure GS 80.

Figure 4A:
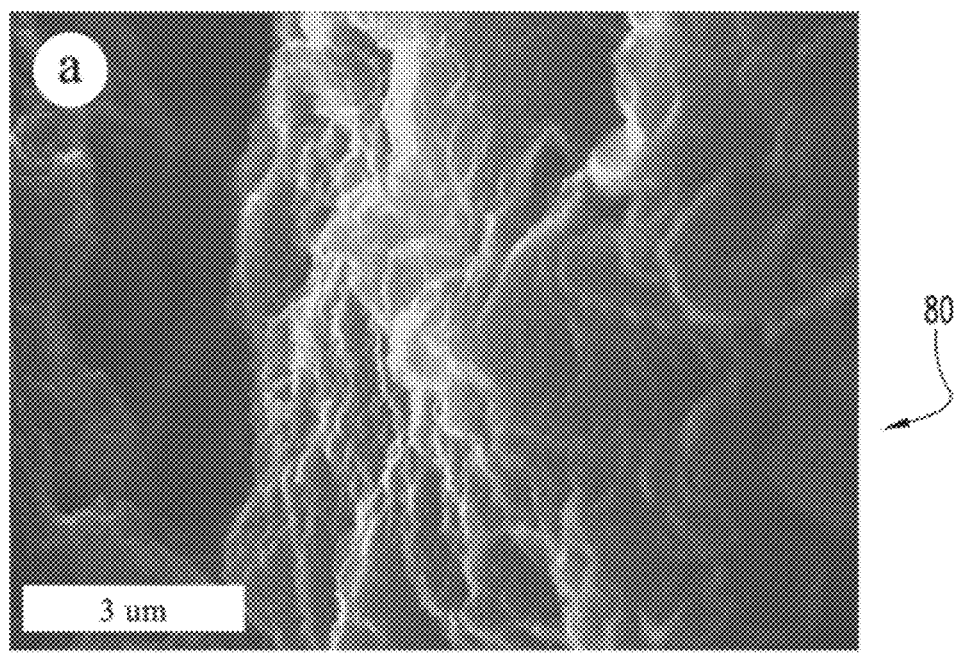
FIG. 4A presents SEM images of the pure GSs.
Figure 4B:
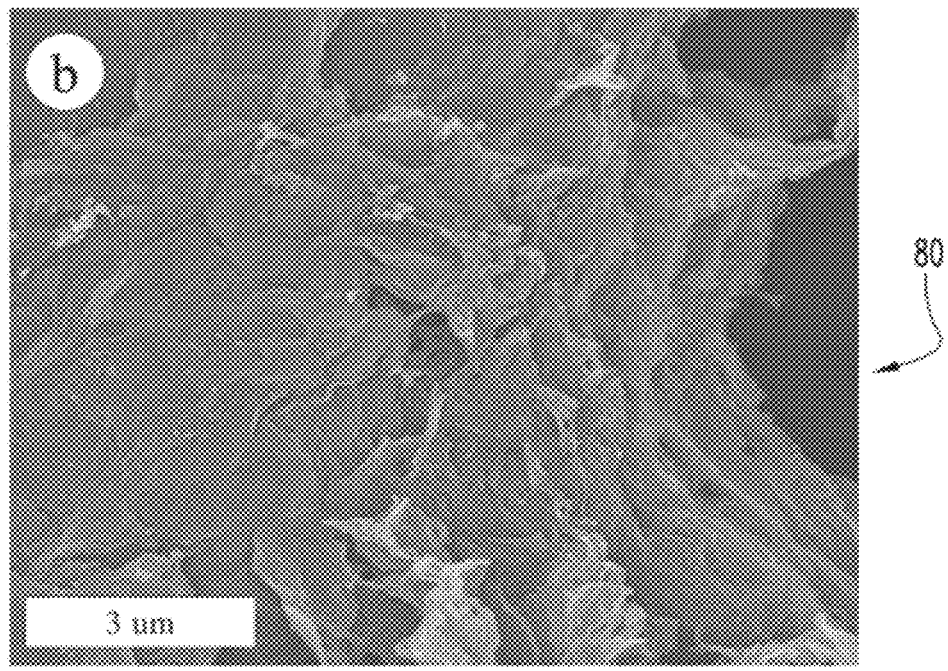
FIG. 4B presents SEM images of GSNCs with a 1% nanocarbon content and a surface area of 1256 $m^2/g$ after drying.

To further characterize the structure of the GSNCs 20, the samples were examined using transmission electron microscopy (TEM) and scanning electron microscopy (SEM) (FIGS. 3 and 4). For comparison, the TEM images of the reduced GSs 10 without nanocarbons 15 and the functionalized nanocarbons 25 (FIGS. 3A and 3D) are also presented. FIG. 3A shows that the pure GSs 80 prepared by chemical reduction 50 were transparent with some wrinkles visible under TEM. The morphology of functionalized nanocarbons 25 can be seen in FIG. 3B, which shows that the functionalized nanocarbon particles 25 were in the range of 5-30 nm, and that they tended to spontaneously agglomerate together to form large particles. The structure of the GSNCs 20 is shown in FIG. 3C, which clearly shows that the functionalized nanocarbons 25 were homogeneously anchored 75 onto the surface of the graphene sheets 30 (FIGS. 3C and 3D). Through further comparisons of FIGS. 3A & 3B with FIGS. 3C & 3D, it is clear that the graphene sheets 30 served as substrates to anchor 75 the hydrophilic nanocarbon particles 25. Without the addition of the nanocarbons, it can be seen that the pure GS 80 was less transparent than the as-prepared GSNCs 20, because the pure graphene sheet 10 spontaneously agglomerated/restacked back and formed a thick graphene sheet stack 80 (which has many more layers of graphene sheet than that of the GSNC 20) after drying. The GSs 10 in the composites 20 were almost transparent, which suggests that the GSs 10 were well separated by the nanocarbon particles 25. The number of layers of graphene sheets 10 in the composites 20 was lower (typically about two layers of GS 10, as suggested by BET data). Considering that sonication was used during the preparation of TEM specimens, the above observation also demonstrates the strong interactions/bonding between the nanocarbon carbon particles 25 and the graphene sheet 10 surface. The SEM images also clearly show the difference between the pure GS agglomerations 80 and the GSNCs 20. The pure GSs 10 after drying tended to restack and form solid particles 80 (FIG. 4A). However, the layered structure can be seen clearly for GSNCs 20, as the small nanocarbon particles 25 are highly dispersed on the graphene sheet 10 surfaces and served as spacers to prevent the graphene sheets 10 from restacking, which is consistent with the observed increased surface area of the graphene sheet/nanocarbon composites 20.

Recently, GS agglomerates 80 have been used as electrodes for supercapacitors; for example, chemically modified GSs electrode active materials in supercapacitors have been found to exhibit a specific capacitance of 135 F/g and 99 F/g in aqueous KOH and organic electrolytes, respectively. GS specimens 80 having a measured surface area of 534 $m^2/g$ have exhibited a capacitance of 150 F/g under the specific current 0.1 A/g. Based on the structure of the GSNCs material 20, the composite 20 likewise is expected to have good electron conductivity, low diffusion resistance to protons/cations, easy electrolyte penetration, and high electroactive areas. Such composites 20 are promising candidates for electrode active materials for supercapacitors 100, yielding high performance energy storage devices.

Figure 5A:
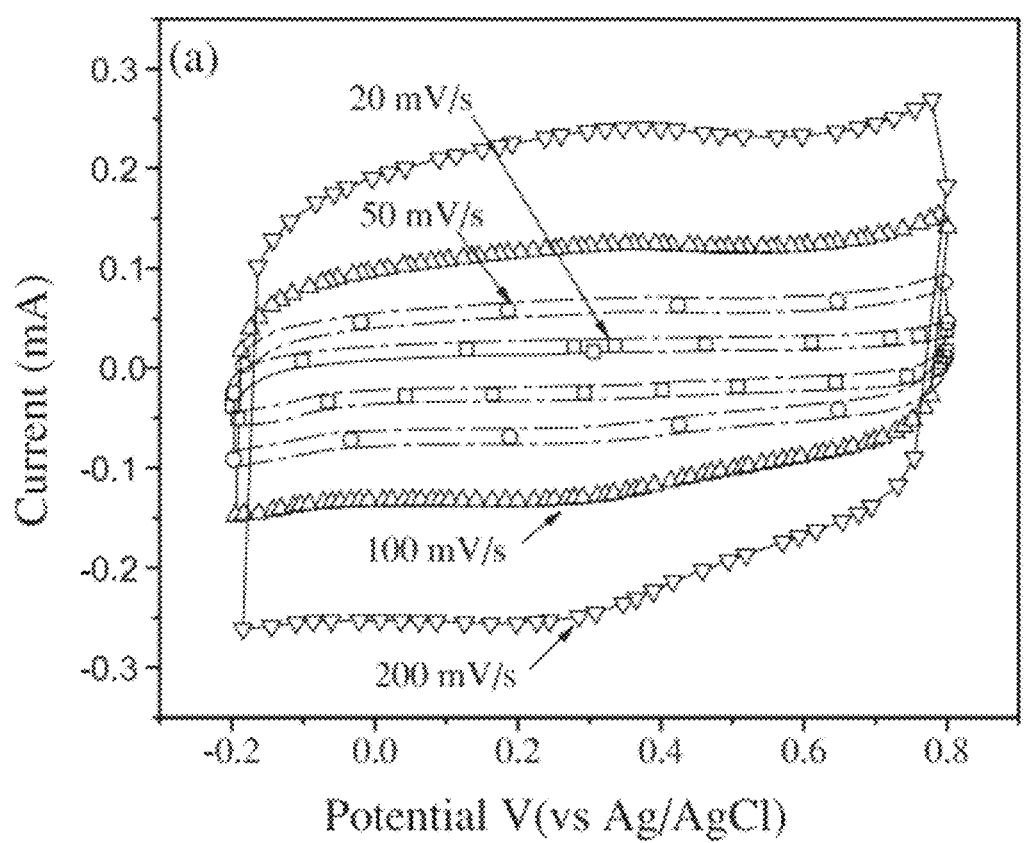
FIG. 5A graphically illustrates CV curves of the as-prepared GSNCs with a surface area of 1256 $m^2/g$, measured at potential intervals from −0.2 to 0.8 V (vs. SHE) in 1 M $H_2SO_4$.
Figure 5B:
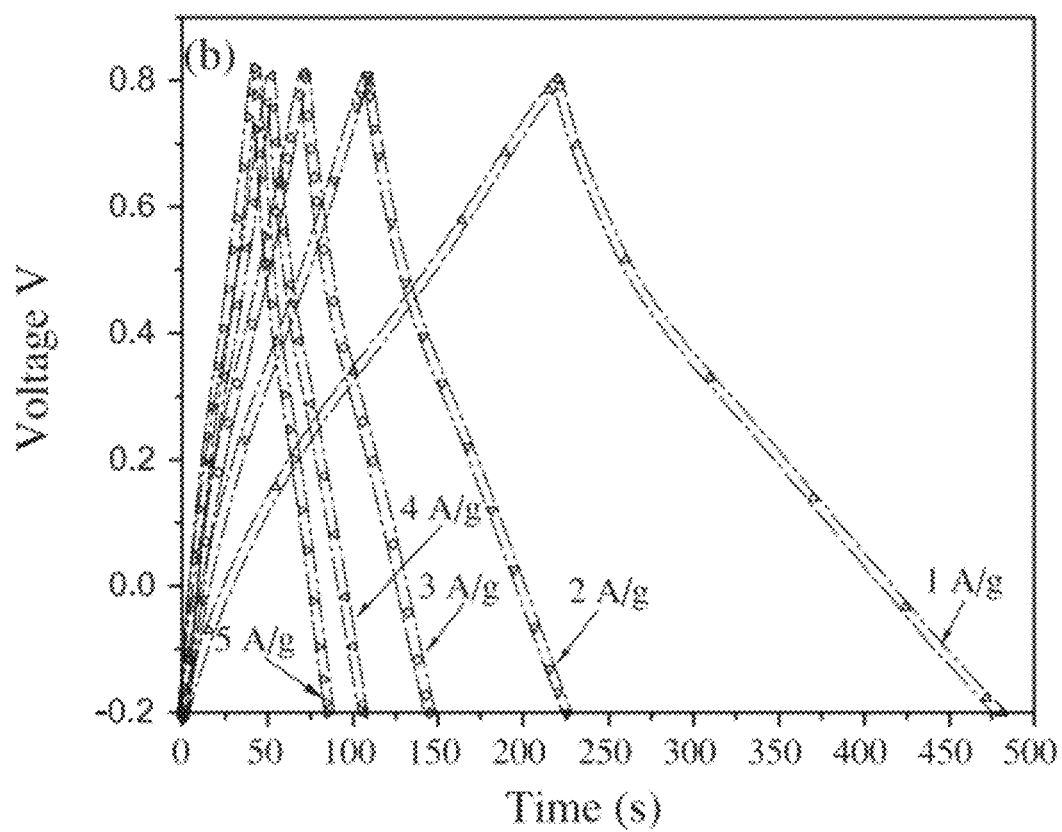
FIG. 5B graphically illustrates voltage of the GSNCs with different nanocarbon content as a function of time.
Figure 5C:
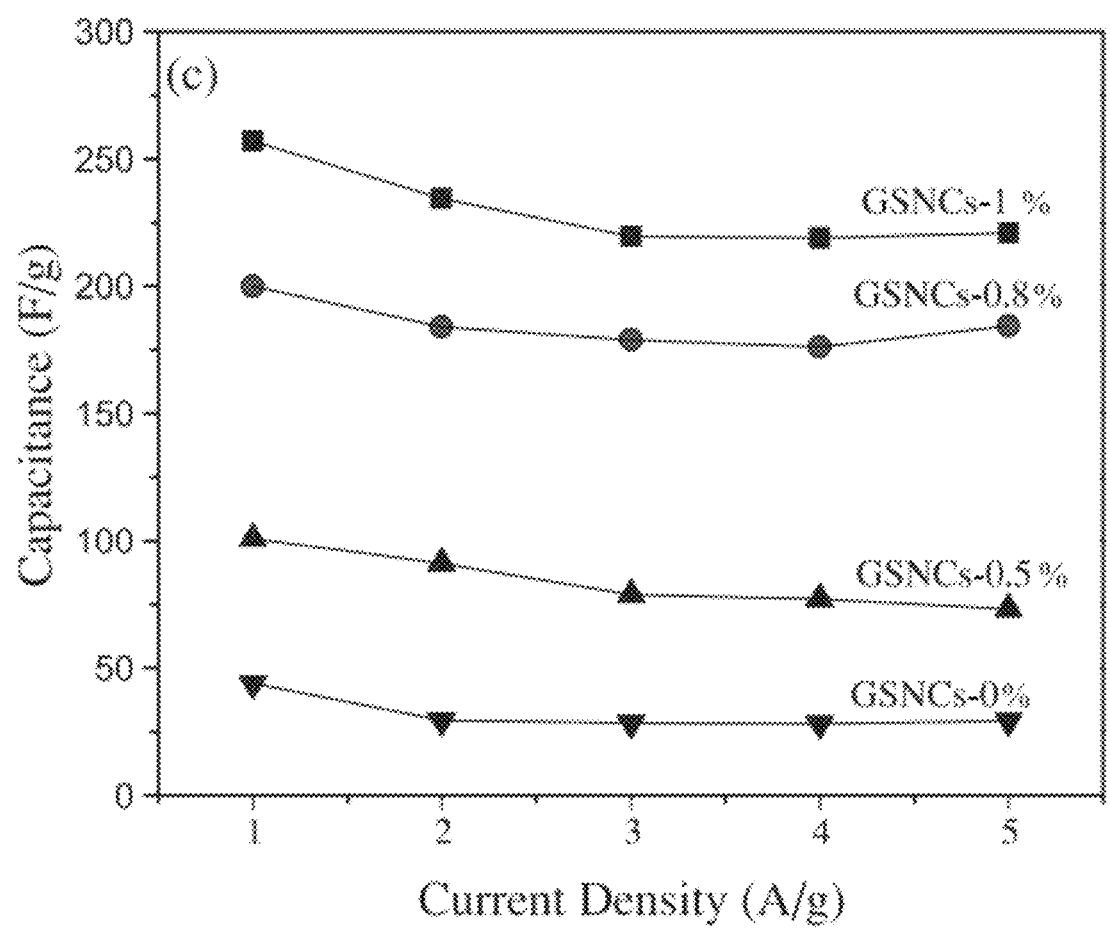
FIG. 5C graphically illustrates the capacitance of the GSNCs with different nanocarbon content as the function of current density.

The properties of these GSNCs 20 were measured using cyclic voltammetry (CV) and galvanostatic charge/discharge. The galvanostatic charge/discharge was used to calculate the specific capacitance of the GSNCs 20. The CV curves (FIG. 5A) were nearly rectangular in shape, indicating a good charge propagation within the electrode. For the supercapacitor 100 using the activated carbon-based electrodes 105, the CV curve shape and the specific capacitance significantly degraded as the voltage scan rate increased. In contrast, as the scan rate increased, the GSNCAs 100 base electrode 105 remained a rectangular shape with little variance, even at a scan rate of 200 mv/s (FIG. 5). Another indication of good charge propagation is the low variation of specific capacitance with the increase of the charge/discharge current density as shown in FIGS. 5B and 5C. The capacitance of the GSNCs 20 was 256 F/g at a discharge current density of 1 A/g, and the capacitance was 218 F/g when the discharge current density increased to 5 A/g, leaving only a 14.8% loss with the 400% increase on the discharge current density. Therefore, the added nanocarbons played a very important role in the electrochemical performance of the composites. The high performance of the GSNC electrode materials 105 in the supercapacitor 100 from the high surface area of this composite 20 is quite beneficial.

The specific capacitance of the GSNCs 20 with different amounts of nanocarbons 25 at various current densities is shown in FIG. 5C for comparison. It is worth noting that the specific capacitance of the high surface area GS composites 20 was much higher than that of the pure GSs 80, and the capacitance increased with the increase of the surface area. Hence, the increased surface area was responsible for the increase of the capacitance. The incorporation of nanocarbon particles 25 into the GSs 20 not only increased the surface area, but also acted as spacers between the graphene sheets 10 to create diffusion paths for the liquid electrolytes, which facilitated the rapid transport of the electrolyte ions, consequently resulting in the improved electrochemical properties of the GSNCs. Therefore, GSNCs 20 with a surface area of 1256 $m^2/g$ exhibited the maximum capacitance of 218 F/g at a current density of 5 A/g compared with pure graphene materials 80 with a capacitance of 46 F/g at the same current density, indicating that the unique structure of the novel GSNCs 20 facilitated the rapid transport of the electrolyte ions and electrons throughout the electrode 105.

The simple process for preparing high surface area GSs 20 by simultaneously reducing the graphene oxide sheets 30 and the functionalized nanocarbons 25 is more particularly described below. This method is easily scaled up for the mass-production of high surface area graphenes 20. The nanocarbon particles 25 are generally dispersed uniformly on the surface of the graphene sheets 10, serving as spacers between graphene sheets 10, and preventing the restacking of the GSs 10 after drying or removal of the solvent. Consequently, the GSNC surface area has been observed as high as 1875 m$^2$/g. The unique structure of the GSNCs 20 facilitated the high-rate transportation of electrolyte ions and electrons throughout the electrode 105, resulting in the excellent electrochemical properties. The supercapacitor 100 based on the GSNCs 20 exhibited a specific capacitance of nearly 400 F/g at a current density of 1 A/g in a 1M H$_2$SO$_4$ solution. The specific capacitance increased with the increase of the composite surface areas. The new high surface area GS material 20 is also useful as a sorbent for hydrogen storage, as a catalyst support for fuel cells, and as a component for other clean energy devices.

Example 1

Synthesis of the Graphene Oxides (GO) and the Functionalized Nanocarbons

GO 30 was synthesized from natural graphite powder (325 mesh) by the modified Hummer method. The GO 30 was then suspended 110 in water to yield an opaque dispersion 60, which was subjected to separation by centrifuge (five times) to completely remove residual salts and acids. The purified GO 30 was then dispersed 120 in purified water (0.5 mg/mL). Exfoliation 40 of the GO 30 was achieved by ultrasonication of the dispersion 60 using an ultrasonic bath. During the composite preparation process, the number of single layers in the GSs 30 as a precursor are typically controlled to be as small as possible. Graphite oxide is a layered material consisting of hydrophilic oxygenated GSs (graphene oxides) 30 bearing oxygen functional groups in their basal planes and edges. Under appropriate conditions, graphite oxides can undergo complete exfoliation in water, yielding colloidal suspensions 60 wherein the suspended material is composed almost entirely of individual graphene oxide sheets 30.

For the preparation of the nanosized carbon particles 25, the EC300 carbon blacks 15 were modified with an —SO$_3$H grafted layer in an aqueous medium by spontaneous reduction 50 of the corresponding in situ generated diazonium cation. The modification of EC300 carbon blacks 15 was prepared with a large excess of in situ-generated diazonium cations. In this experiment, 2 g of EC300 carbon blacks 15 were placed in a 0.5 M HCl solution 125 containing 3.5 g of sulfonic acid. The solution 125 was vigorously stirred for thirty minutes before sodium nitrite was added. Next, 3.6 g NaNO$_2$ was added to the solution 125 in order to ensure a total transformation of the amine into diazonium in spite of the nitrogen oxide gas release. For the reaction to be finished completely, the mixture was stirred for four hours and then heated up to 70° C. for another three hours. Finally, the mixture was filtrated, washed with water, and re-filtrated three times.

Synthesis of the GSNCs

GSNCs 20 with different nanocarbon content were prepared by simultaneously reducing 50 the mixture of the graphene oxide sheets 30 and the highly hydrophilic nanocarbons 25. Graphene oxide sheets 30 dispersed in water were mixed with the nanocarbons 25. The mixture was stirred for thirty minutes and then subjected to ultrasonication for one hour at room temperature. Subsequently, a hydrazine solution was added into the mixture and the mixture was stirred and heat treated at 100° C. for 24 hours. Then the mixture was filtered and washed with purified water several times and dried at 60° C. for 24 hours in a vacuum.

Characterization of the Composites

The morphology of the graphene sheets 10, the nanocarbons 25, and the GSNCs 20 were characterized by a transmission electron microscope. The morphology of the composites 20 was also examined by a scanning electron microscope. The specific surface areas of the graphene sheet 10, the nanocarbons 25, and the GSNCs 20 were measured by the Brunauer-Emmett-Teller (BET) method of nitrogen sorption at the liquid nitrogen temperature (77 K). Further, the composite materials 20 are stable at elevated temperatures and exhibit degradation or etching at the nanocarbon particle 25 sites.

Preparation and Characterization of the Supercapacitor Electrode

A three-electrode-cell system was used to evaluate electrochemical performance using both cyclic voltammetry and galvanostatic charge/discharge techniques using an electrochemical workstation. A 1M H$_2$SO$_4$ aqueous solution was used as the electrolyte. A platinum sheet and a saturated Ag/AgCl electrode were used as the counter and the reference electrodes, respectively. The working electrode 105 was prepared by casting a Nafion-impregnated sample onto a glassy carbon electrode with a diameter of 5 mm. Next, 17.5 mg of composite material 20 was dispersed by sonication for ten minutes in a 10 mL water solution containing 54 of a Nafion solution (5 wt. % in water). This sample (10 μL) was then dropped onto the glassy carbon electrode and dried overnight before electrochemical testing. The specific gravimetric capacitance was obtained from the discharge process according to the following equation:

$$C = \frac{I\Delta t}{\Delta V m}$$

where I is the current load (A), Δt is the discharge time (s), ΔV is the potential change during the discharge process, and m is the mass of active material in a single electrode (g).

Figure 6:
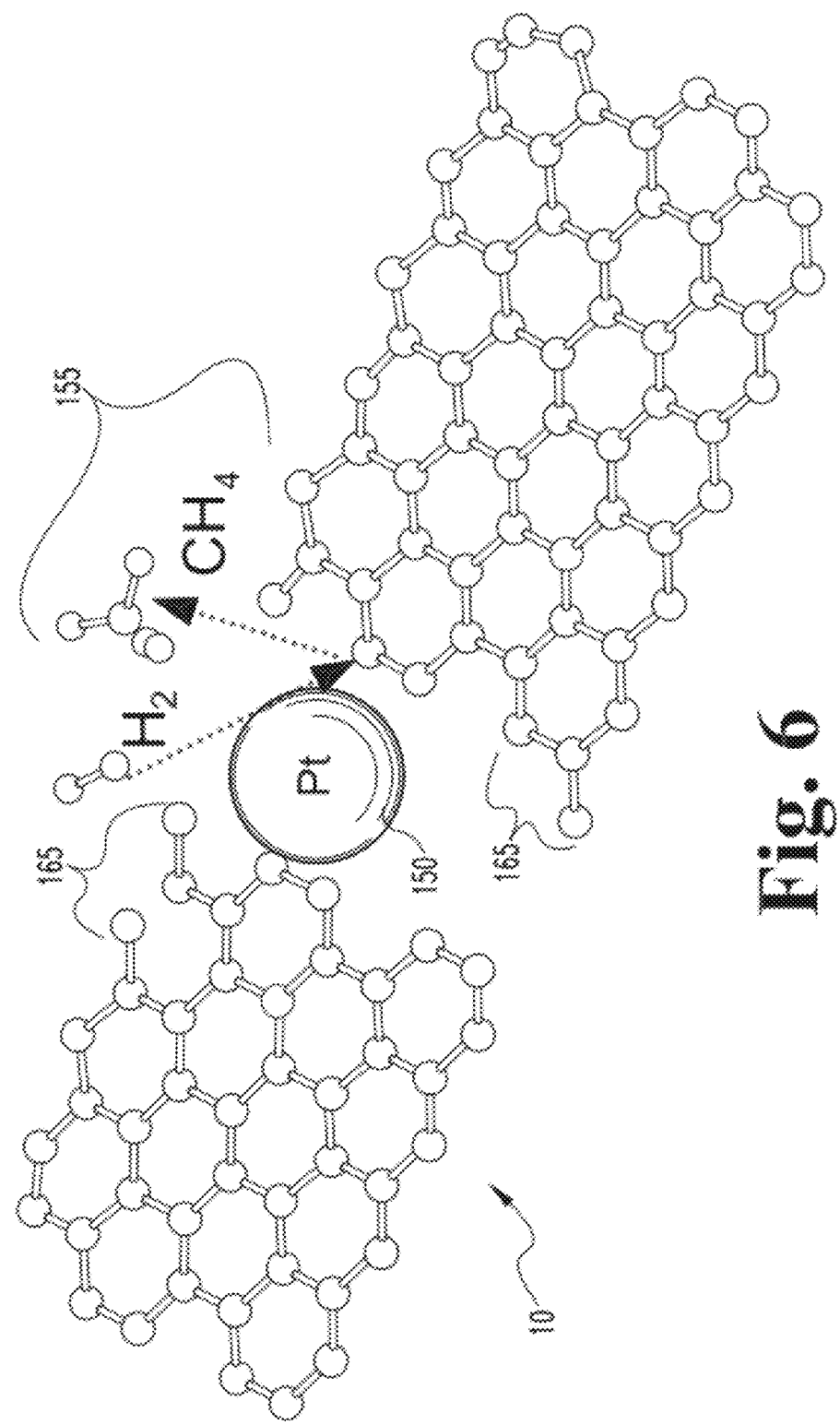
FIG. 6 schematically illustrates Pt nanoparticle etching process on the surface of graphene sheets, according to another embodiment of the present novel technology.

Graphene 10 is generally quite inert when exposed to gases such as oxygen and hydrogen at room temperature. At high temperatures, oxygen exposure can cause preferential etching at defects and edges because the carbon atoms at the defects and edges are extremely reactive (this is because the p$_z$ electrons of these carbon atoms may not be involved in the conjugated electron system). In a hydrogen atmosphere, the carbon atoms in the graphene bulk remain inert even at high temperatures. However, carbon atoms both at defects and at the edges of a graphene sheet become very active when a reactive metal is positioned proximate to these atoms. At high temperatures, Pt nanoparticles 150 may be used to etch graphene 10 through the catalytic hydrogenation of carbon, where carbon atoms on the graphene edges dissociate on the surface of Pt nanoparticle 150 and then react with H$_2$ at the Pt nanoparticle 150 surface to form methane. This process is shown schematically in FIG. 6. In contrast, such etching does not occur on graphene materials at carbon black or like carbonaceous particle sites.

Figure 7A:
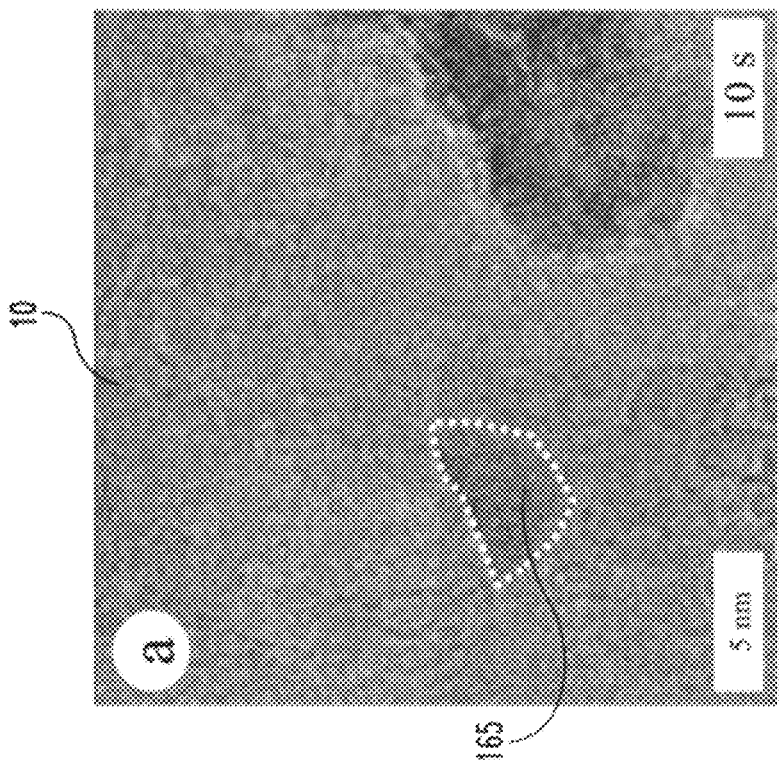
FIG. 7A is a first atomic resolution electron micrographs showing the dynamic etching of graphene sheets by Pt nanoparticles and the resulting trenches left behind in the graphene according to the embodiment of FIG. 6.
Figure 7B:
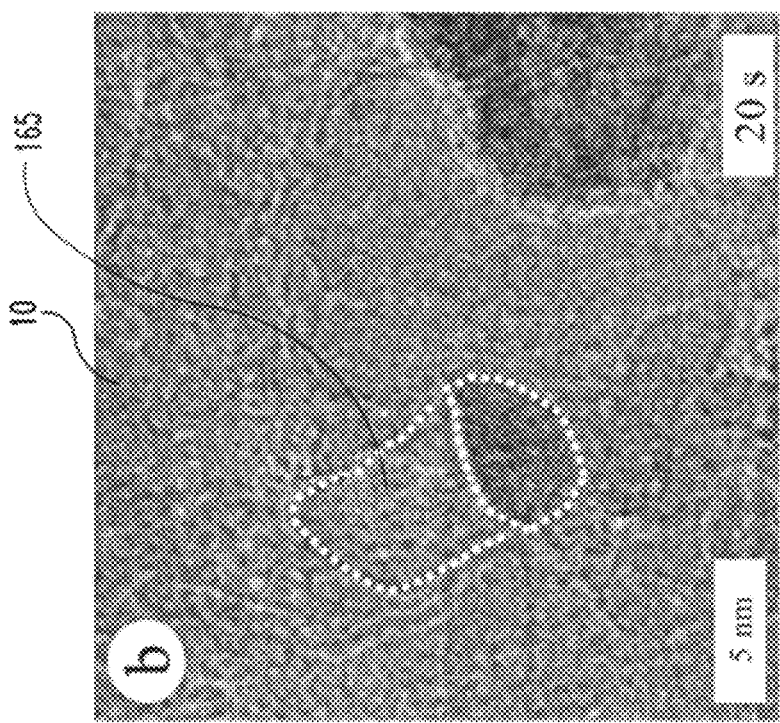
FIG. 7B is a second atomic resolution electron micrographs showing the dynamic etching of graphene sheets by Pt nanoparticles and the resulting trenches left behind in the graphene according to the embodiment of FIG. 7A.
Figure 7D:
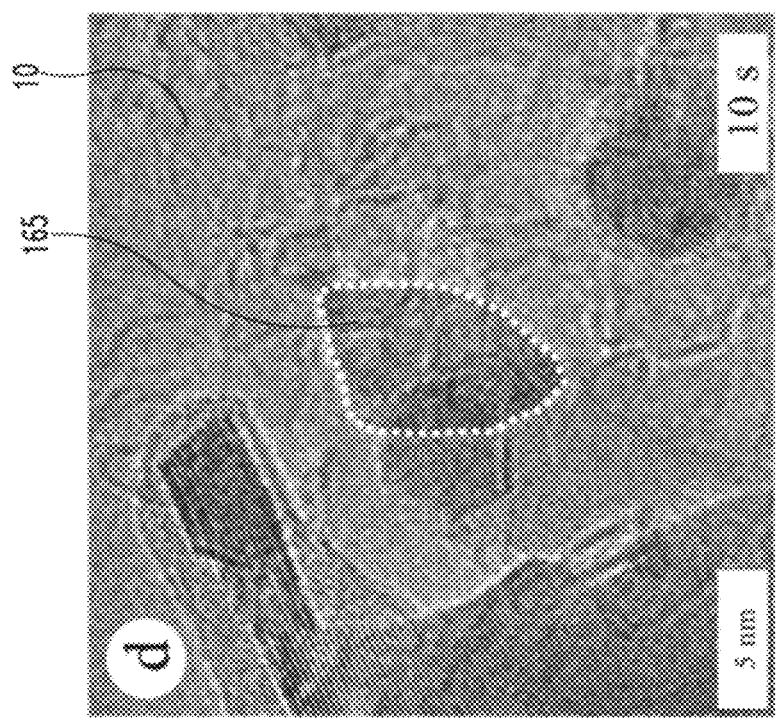
FIG. 7D is a fourth atomic resolution electron micrographs showing the dynamic etching of graphene sheets by Pt nanoparticles and the resulting tortured path left behind in the graphene according to the embodiment of FIG. 6.
Figure 7C:
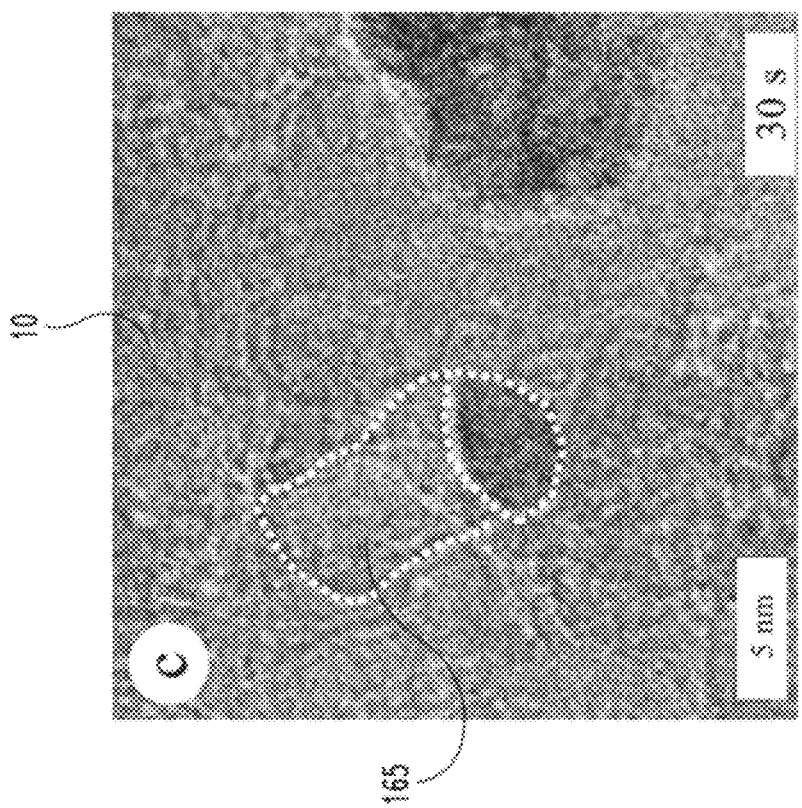
FIG. 7C is a third atomic resolution electron micrographs showing the dynamic etching of graphene sheets by Pt nanoparticles and the resulting trenches left behind in the graphene according to the embodiment of FIG. 7A.
Figures 7E, 7F:
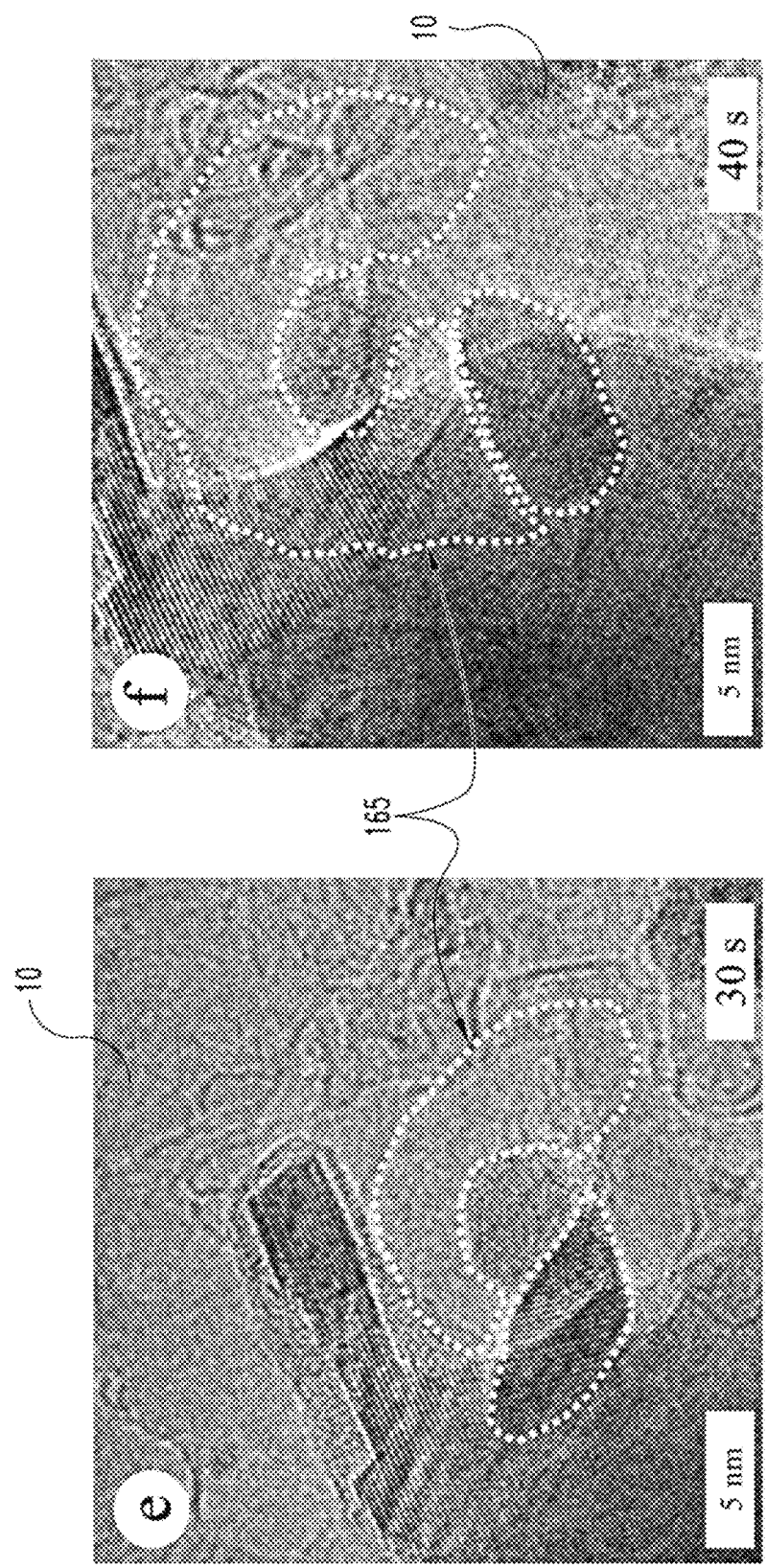
FIG. 7E is a fifth atomic resolution electron micrographs showing the dynamic etching of graphene sheets by Pt nanoparticles and the resulting etch path left behind in the graphene according to the embodiment of FIG. 7D.
FIG. 7F is a sixth atomic resolution electron micrographs showing the dynamic etching of graphene sheets by Pt nanoparticles and the resulting etch path left behind in the graphene according to the embodiment of FIG. 7D.

The mechanism of etching of graphene 10 by Pt nanoparticles 150 at elevated temperature was observed in-situ using high-resolution environmental transmission electron microscopy. Graphene sheets 10 were loaded with 20 weight percent of Pt nanoparticles 150, and subsequently placed onto a lacey carbon TEM grid. The Pt nanoparticles 150 are typically sized between a few nanometers up to ten microns across, and may even be larger. More typically, the Pt nanoparticles are between about 5 and about 80 nanometers in diameter, although the Pt nanoparticles 150 may more typically range from about 10 nanometers to about 50 nanometers in diameter. The Pt nanoparticles 150 are typically generally spherical, but may exhibit other morphologies. Further, the nanoparticles 150 may be made of PT-like materials, such as PT, Pd, Ni, combinations thereof, and the like. Likewise, in this example, the graphene sheets 10 were loaded with 20 weight percent Pt nanoparticles 150, but the nanoparticle loading may typically vary from less than about 1 weight percent to as much as 50 weight percent, or more. The graphene samples 10 were heated to 800° C. and hydrogen gas was slowly introduced into the TEM objective lens, and equilibrated at a pressure of approximately 50 mTorr. As the graphene 10 began to etch adjacent the Pt nanoparticles 150, the process was imaged continuously through the use of a high-frame rate camera. Image sequences extracted therefrom are presented as FIG. 7A-7F. Initially, the Pt nanoparticles 150 were static after the hydrogen gas was introduced. Eventually, as shown in FIGS. 7A-7C, the Pt nanoparticles 150 began to react with the graphene 10 at defect sites and the hydrogen gas to produce methane. Only those carbon atoms making up the graphene sheet 10 that were in direct contact with these Pt nanoparticles 150 were able to participate in this Pt-catalyzed hydrogenation reaction 155. Once the process was initiated, the conversion process was able to continue, as there are an abundance of defects sites created continuously following the onset of the etching process 155, leading to a self-sustaining reaction. In this case a straight trench was etched through the graphene sheet 10 (FIG. 7C). In other cases, the etching process 155 did not follow a straight line, but rather followed a more tortuous pathway (FIGS. 7D-7F). During the graphene etching process 155, the Pt nanoparticles 150 were observed to maintain a crystallographic relationship with the graphene sheet 10. After etching 155, the Pt nanoparticles 150 are typically reclaimed and saved for future use. These observations indicate that the interaction between the Pt 150 and the graphene 10 at elevated temperature can create a variety of in-plane nanostructures 160 in the graphene 10. The result of these interactions is the formation of nanoscale trenches, ribbons and islands 160— and thus a dense network of edge sites 165.

Typically, the graphene sheets 10 are heated to a temperature sufficient for the etching process 155 to occur at a desired rate. The graphene sheets 10 carrying dispersed Pt nanoparticles 150 are typically heated to at least about 700 degrees Celsius, and are more typically heated to a temperature in the range from 750 degrees Celsius to 900 degrees Celsius. Likewise, a hydrogen gas environment supports the Pt-catalyzed hydrogenation reaction 155, although other reducing environments may also be selected.

Figure 8B:
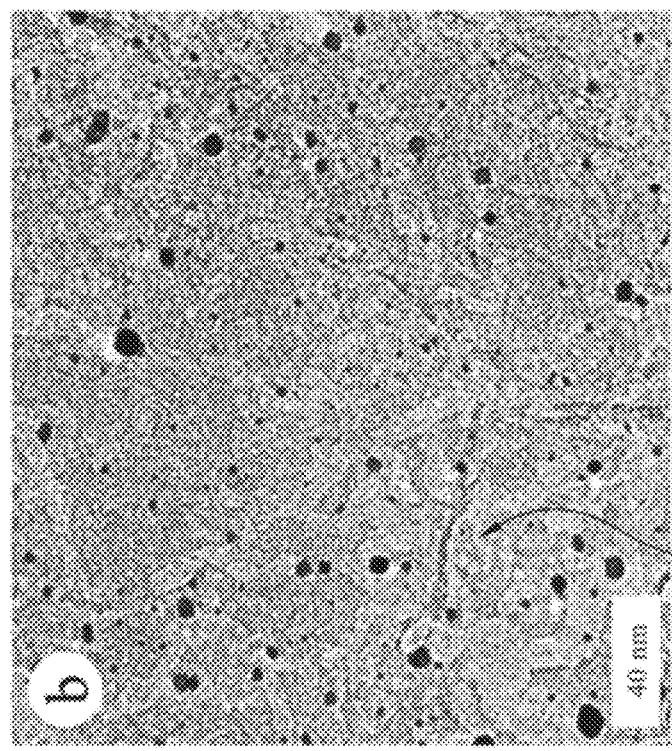
FIG. 8B is an electron micrograph of Pt nanoparticles etched graphene according to the embodiment of FIG. 6.
Figure 8A:
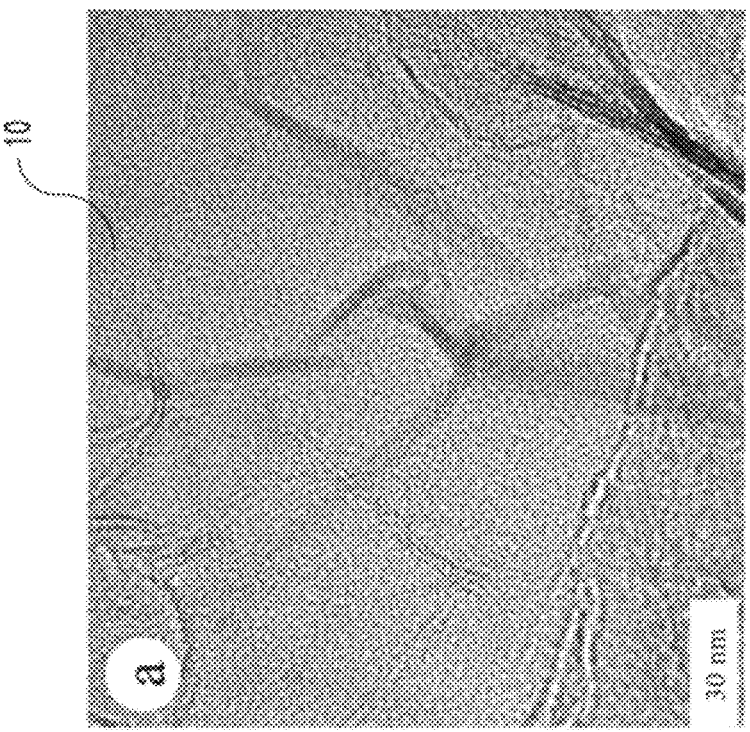
FIG. 8A is an electron micrograph of pristine graphene.
Figure 9:
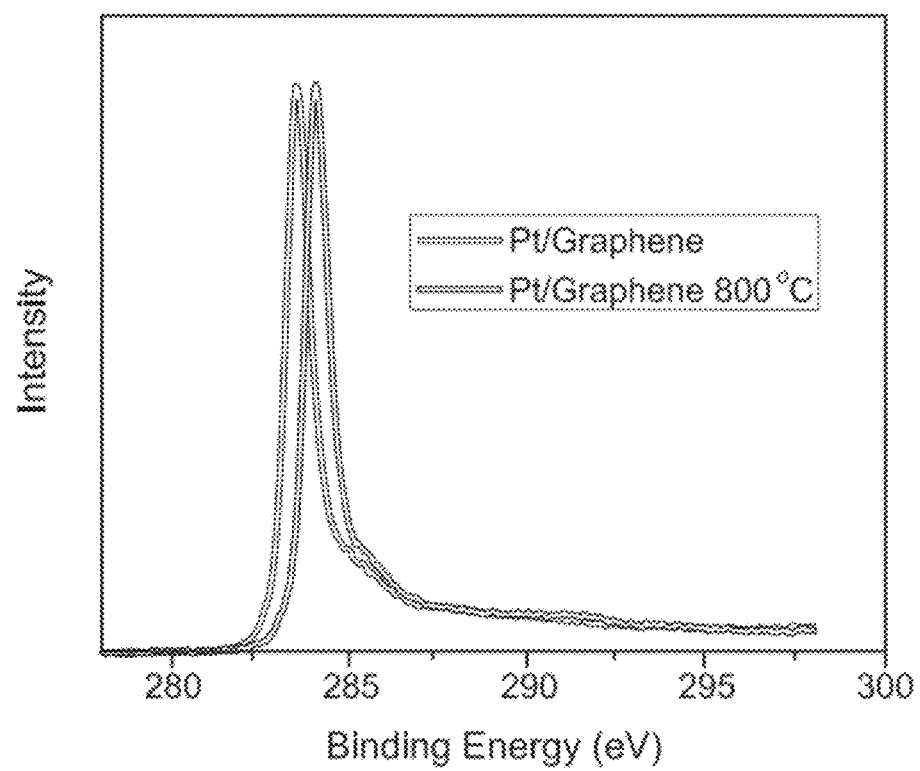
FIG. 9 graphically illustrates the XPS spectra of graphene before and after Pt nanoparticulate etching, according to the embodiment of FIG. 6.
Figure 10A:
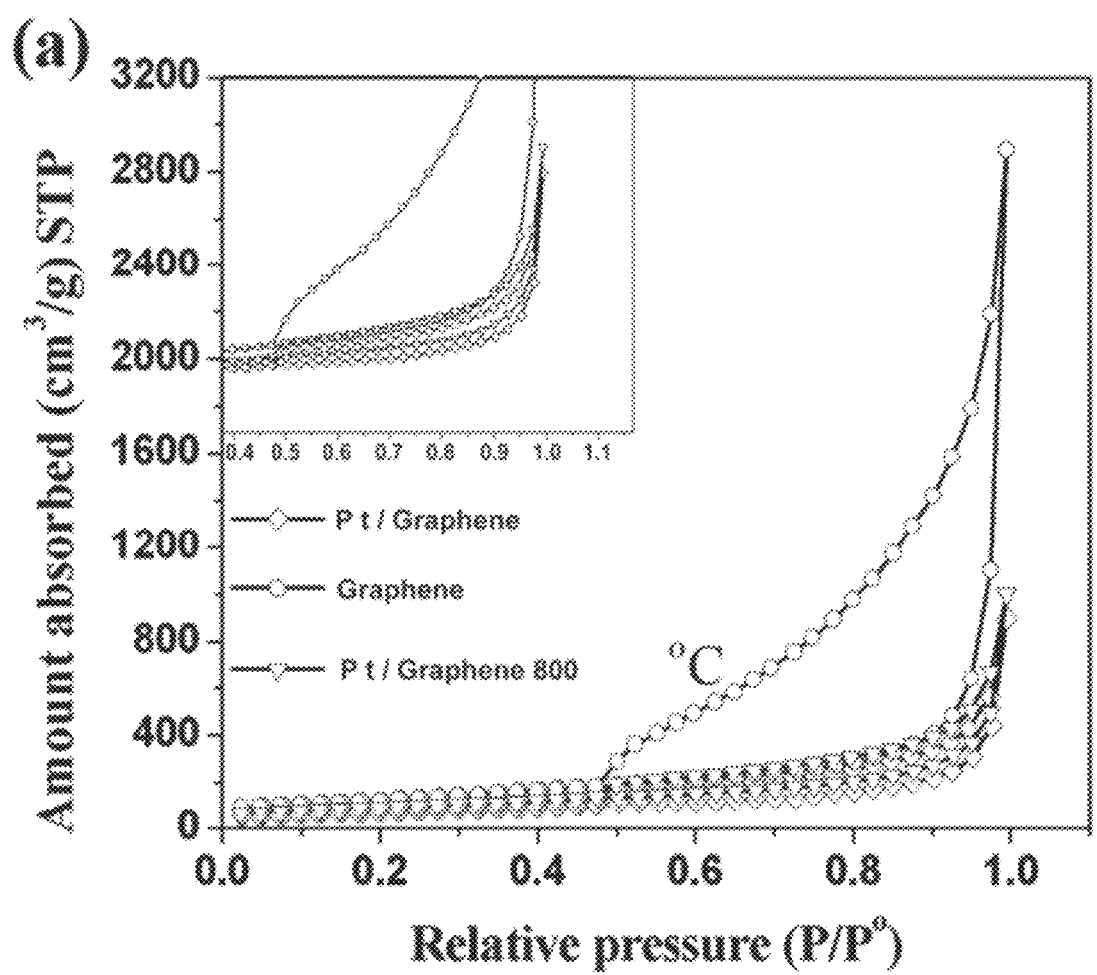
FIG. 10A graphically illustrates the $N_2$ adsorption isotherms and $CO_2$ capture properties of graphene composites for graphene, Pt/Graphene, and Pt/Graphene 800° C. at 77 K. P/P°, relative pressure; STP, standard temperature and pressure.
Figure 10B:
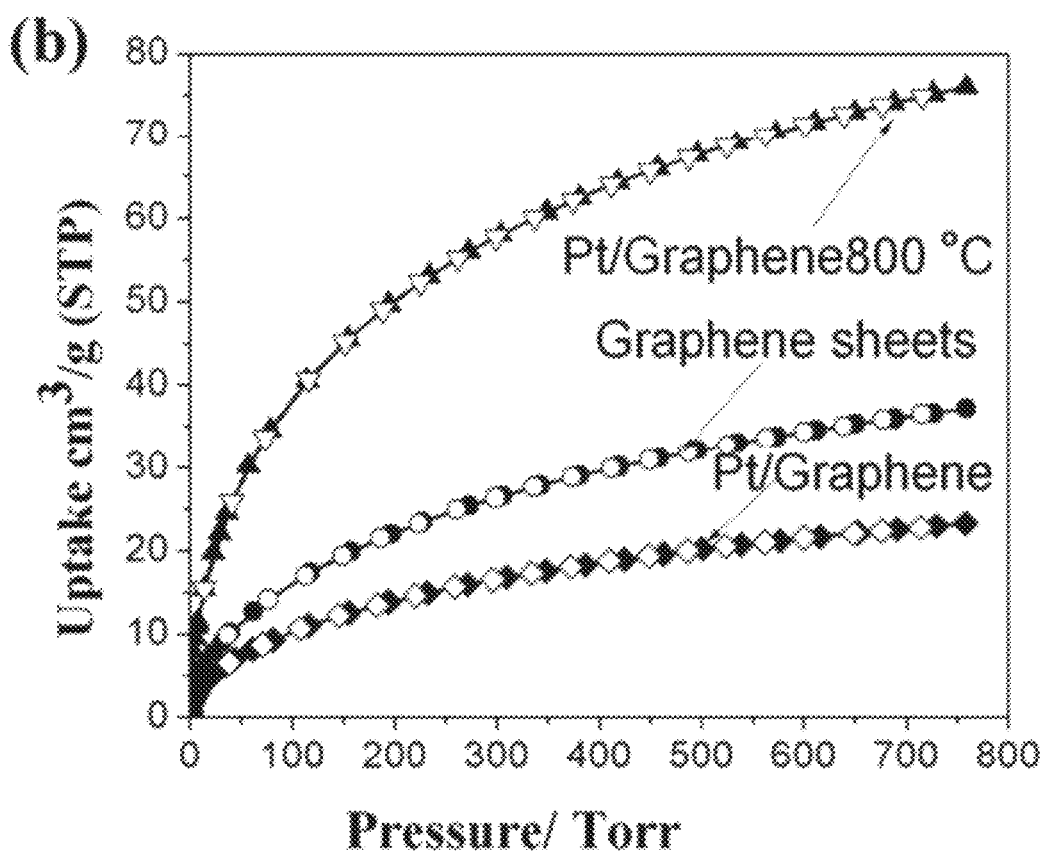
FIG. 10B graphically illustrates the $N_2$ adsorption isotherms and $CO_2$ capture properties of graphene composites for graphene, Pt/Graphene, and Pt/Graphene 800° C. at 273 K; filled and open symbols represent adsorption and desorption branches, respectively.
Figure 11:
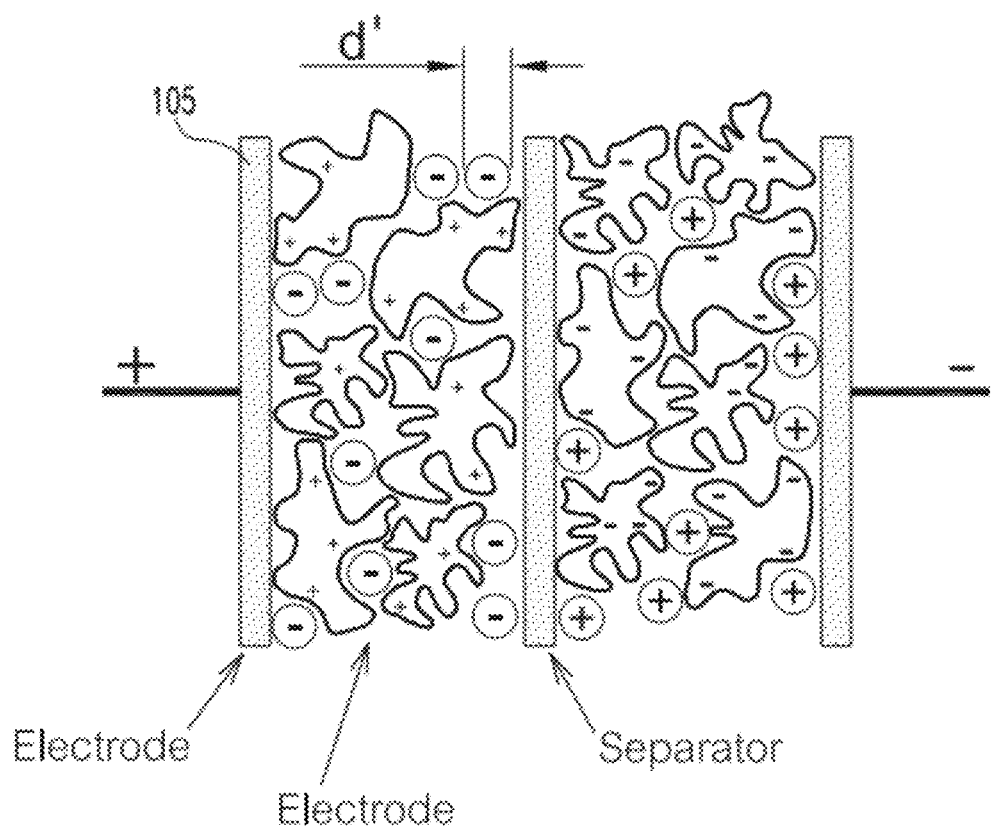
FIG. 11 is a schematic illustration of a supercapacitor using electrodes made from the embodiment of FIG. 1.

In graphene 10, each carbon atom uses 3 of its 4 valance band (2s, 2p) electrons (which occupy the $sp^2$ orbits) to form covalent bonds with the neighboring carbon atoms in the same plane. Each carbon atom in the graphene 10 contributes its fourth lone electron (occupying the $p_z$ orbit) to form a delocalized electron system. Thus, the carbon atoms in the graphene plane 10 (excluding the carbon atoms on the defect sites such as the edges and holes) are saturated carbon atoms, with the three $sp^2$ electrons forming three covalent bonds and the fourth $p_z$ electron forming a π bond. Real time observations indicate that the heat treatment process creates an abundance of defective edges 165, in the form of embedded nanostructures of trenches, ribbons and islands 160 in the multilayer graphene sheets 10 (see FIGS. 7 and 8B). The resulting materials are anisotropic, having different properties in-plane and out-plane. Importantly, the carbon atoms along the edges of the resulting trenches, ribbons, and the islands 160 are likely to be unsaturated, with one of the electrons in the $sp^2$ orbitals not forming a covalent bond with the other carbon atoms. These unsaturated carbon atoms were observed not only from the nano-scale in situ TEM images/video (FIG. 7), but also from the macro-scale XPS results in FIG. 9, which shows an 42.4% increase of the shake-up peak for the graphene sheet 10 after etching 155 (the shake-up peaks correspond to the unsaturated carbon atoms/dangling carbons).

The resulting material provides an important platform for a wide variety of applications, including in catalysis, biomedical science, polymer science and energy science. This is because these unsaturated carbon atoms allow graphene 10 to be functionalized by chemically grafting other compounds or groups thereonto. Thus, these functionalized graphene 170 can be used, for example, sensors, catalysts, sorbents, and the like. Without such features, it is difficult to chemically graft compounds or groups onto graphene 10. These unsaturated carbons also promote the establishment of weak bonding between graphene and other species. One such application is gas physisorption. Of particular interest is the physisorption of carbon dioxide. The $p_z$ electrons and one $sp^2$ electron of these unsaturated carbon atoms at the defects sites will be available for bonding and will more readily form bonds with $CO_2$ molecules, which could in turn result in a significant improvement in $CO_2$ adsorption. The adsorbed $CO_2$ molecules (or other gas molecules) may be stored for later removal or reaction.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A multilayer graphene composite structure, comprising:
   a first graphene sheet;
   a second graphene sheet spaced at least 5 nm away from the first graphene sheet; and
   a plurality of metallic spacers disposed between the respective first graphene sheet and the second graphene sheet;
   wherein each respective metallic spacer is in contact with the first graphene sheet and the second graphene sheet;
   wherein the plurality of metallic spacers are selected from the group including platinum particles, palladium particles, nickel particles, and combinations thereof; and
   wherein the respective graphene sheets each includes a plurality of etched defect structures, each etched defect structure positioned where each respective graphene sheet intersects a respective metallic spacer.

2. The structure of claim 1 wherein the etched defect structures are members of the group including trenches, ribbons, islands and combinations thereof.

3. The structure of claim 1 wherein the spacers have diameters of between about 5 nanometers and about 80 nanometers.

4. A multilayer graphene composite material, comprising:
a first graphene sheet;
a second graphene sheet spaced at least 5 nm away from the first graphene sheet; and
a plurality of metallic spacers disposed between the respective first graphene sheet and the second graphene sheet;
wherein the metallic spacers have diameters of between about 5 nanometers and about 80 nanometers;
wherein each respective metallic spacer rests against the first graphene sheet and the second graphene sheet;
wherein the plurality of metallic spacers are selected from the group including platinum particles, palladium particles, nickel particles, and combinations thereof; and
wherein the respective graphene sheets each includes a plurality of defect nanostructures, each defect nanostructure positioned where each respective metallic spacer rests against a respective graphene sheet.

5. A multilayer graphene composite electrode material, comprising:
a first graphene sheet;
a second graphene sheet spaced at least 5 nm away from the first graphene sheet; and
a plurality of metallic spacers disposed between the respective first graphene sheet and the second graphene sheet;
wherein each respective metallic spacer is contained between the first and second graphene sheet;
wherein the metallic spacers have diameters of between about 5 nanometers and about 80 nanometers;
wherein each respective metallic spacer pushes the first and second graphene sheets apart;
wherein the plurality of metallic spacers are selected from the group including platinum particles, palladium particles, nickel particles, and combinations thereof; and
wherein each respective graphene sheet includes a plurality of etched nanostructures, each etched nanostructure positioned where a respective metallic spacer rests against a respective graphene sheet.

* * * * *